(12) United States Patent
Kim et al.

(10) Patent No.: US 8,031,664 B2
(45) Date of Patent: Oct. 4, 2011

(54) CHANNEL MANAGEMENT METHOD AND CHANNEL SELECTION METHOD FOR WIRELESS NODE IN WIRELESS AD-HOC NETWORK

(75) Inventors: Young Han Kim, Seoul (KR); Min Su Kang, Seoul (KR)

(73) Assignee: Soongsil University Research Consortium techno-PARK, Seoul (KR)

( * ) Notice: Subject to any disclaimer, the term of this patent is extended or adjusted under 35 U.S.C. 154(b) by 781 days.

(21) Appl. No.: 11/979,925

(22) Filed: Nov. 9, 2007

(65) Prior Publication Data

US 2009/0092084 A1 Apr. 9, 2009

(30) Foreign Application Priority Data

Oct. 5, 2007 (KR) .................. 10-2007-0100253

(51) Int. Cl.
*H04W 4/00* (2009.01)
(52) U.S. Cl. ...... 370/329; 370/431; 370/464; 455/452.2; 455/455; 455/513; 455/516

(58) Field of Classification Search .................. 370/329, 370/431, 464; 455/450, 452.1, 452.2, 455, 455/509, 513, 516
See application file for complete search history.

(56) References Cited

U.S. PATENT DOCUMENTS

| | | | |
|---|---|---|---|
| 2004/0137907 A1* | 7/2004 | Kim | 455/450 |
| 2008/0151821 A1* | 6/2008 | Cho et al. | 370/329 |
| 2008/0165797 A1* | 7/2008 | Aceves | 370/458 |

\* cited by examiner

*Primary Examiner* — Luat Phung
(74) *Attorney, Agent, or Firm* — Sherr & Vaughn, PLLC

(57) ABSTRACT

Provided are a channel management method and a channel selection method for a wireless node in a wireless ad-hoc network. The channel management method includes the steps of: (a) when a current mode is a first mode, performing channel selection using a method for evenly distributing a channel within an interference range; and (b) when the current mode is a second mode, performing channel selection based on a channel switching probability. According to the method, by preventing a channel change from being continuously repeated in a wireless ad-hoc network using multi-channel multi-interface, it is possible to prevent data transmission delay and network performance deterioration.

11 Claims, 8 Drawing Sheets

-Related Art-

-Related Art-

-Related Art-

-Related Art-

-Related Art-

-Related Art-

FIG. 8

| CHANNEL | CHANNEL 1 | CHANNEL 2 | CHANNEL 3 |
|---|---|---|---|
| DISTRIBUTION NUMBER WITHIN INTERFERENCE RANGE $\alpha_i$ | $\alpha_1 = 4$ | $\alpha_2 = 2$ | $\alpha_3 = 7$ |
| PARAMETER $R_i$ = CONSTANT (SET TO 1 FOR CONVENIENCE)/$\alpha_i$ | 1/3 | 1/2 | 1/7 |
| CHANNEL SWITCHING PROBABILITY $P_i = R_i / \sum_{n=1}^{N} R_n$ | 0.34 | 0.51 | 0.15 |

CHANNEL MANAGEMENT METHOD AND CHANNEL SELECTION METHOD FOR WIRELESS NODE IN WIRELESS AD-HOC NETWORK

CROSS-REFERENCE TO RELATED APPLICATION

This application claims priority to and the benefit of Korean Patent Application No. 10-2007-0100253, filed Oct. 5, 2007, the disclosure of which is incorporated herein by reference in its entirety.

BACKGROUND

1. Field of the Invention

The present invention relates to a channel management method and a channel selection method for a wireless node in a wireless ad-hoc network, and more particularly, to a method in which a wireless node changes or resets a reception interface channel according to a possibility in consideration of channel distribution of surrounding wireless nodes.

2. Discussion of Related Art

In general, a wireless node of a wireless ad-hoc network uses single-channel single-interface. In a wireless ad-hoc network based on single-channel single-interface, all wireless nodes use the same channel. Therefore, when a wireless node transmits data, neighbor nodes, i.e., other wireless nodes adjacent to the wireless node, cannot transmit data, as illustrated in FIG. 1. Here, the term "neighbor node" denotes another wireless node located within the transmission range of one wireless node, and the term "transmission range" denotes coverage within one hop of a wireless node.

To solve the problem and efficiently use wireless resources, wireless ad-hoc networks based on multi-channel have been suggested as shown in FIGS. 2 and 3. FIG. 2 illustrates a wireless ad-hoc network based on multi-channel single-interface, and FIG. 3 illustrates a wireless ad-hoc network based on multi-channel multi-interface.

When a wireless node transmits data in a wireless ad-hoc network based on multi-channel single-interface, neighbor nodes can transmit data through other channels. However, the wireless node uses a single interface and thus cannot simultaneously perform a transmitting operation and a receiving operation, as illustrated in FIG. 2.

In a wireless ad-hoc network based on multi-channel multi-interface, a wireless node and neighbor nodes can simultaneously transmit data and can also simultaneously perform a receiving operation as well as a transmitting operation. Therefore, it is possible to efficiently use wireless resources using multi-channel multi-interface.

FIG. 4 illustrates the structure of a wireless node using multi-channel multi-interface. Between an Internet Protocol (IP) layer 401 and a Media Access Control (MAC) layer 404, a channel control layer 400 controls the channel of each interface. In addition, a data queue 406 is divided into several channel queues 407, thereby classifying data of respective channels. A fixed interface 402 in charge of a reception interface channel receives data through an interface whose channel is not frequently changed. A switchable interface 403 in charge of a transmission interface channel transmits data through an interface whose channel is frequently changed. In other words, when there is data to be transmitted, the wireless node changes the channel of the switchable interface 403, i.e., the transmission interface channel, to the channel of the fixed interface 402, i.e., the reception interface channel, of a neighbor node corresponding to a next hop, and then transmits the data through the switchable interface 403.

FIG. 5 illustrates a data transfer process in a wireless ad-hoc network based on multi-channel multi-interface. When a first node NODE_1 transmits data to a third node NODE_3, the data must pass through a second node NODE_2 to be transmitted to the third node NODE_3. The first node NODE_1 changes the channel of its switchable interface to a channel CH_3 of a fixed interface of the second node NODE_2 (step 500), and then transmits the data to the second node NODE_2 (step 502). The second node NODE_2 receiving the data from the first node NODE_1 changes the channel of its switchable interface to a channel CH_2 of a fixed interface of the third node NODE_3 (step 504), and then transmits the data to the third node NODE_3 (step 506).

Meanwhile, to efficiently use a channel in an ad-hoc network environment based on multi-channel multi-interface, the number of wireless nodes using each channel must be similar to each other. To this end, each wireless node determines a channel according to the following method. Each wireless node selects and sets its own reception interface channel so that channels are evenly distributed within its interference range. More specifically, each wireless node collects information on channel distribution within its interference range and then determines the least distributed channel as its own reception interface channel. Here, the term "interference range" denotes coverage within two hops of a wireless node.

Operation of each wireless node according to the above-described data transmission technique and channel selection method is summarized as follows. Each wireless node periodically broadcasts a Hello message. In addition, the wireless node updates its own reception interface channel on the basis of a Hello message received from a neighbor node so that channels are evenly distributed within its interference range. Further, when the wireless node transmits data, it changes its transmission interface channel to the reception interface channel of the next hop and then transmits the data to the next hop.

Meanwhile, to perform the above-described data transmission, the wireless node must know the channel of the fixed interface of a neighbor node, i.e., a node one-hop away from the wireless node. In addition, to perform the above-described conventional channel selection method, the wireless node must know the channels of the fixed interfaces of a neighbor node and a wireless node two hops away from the wireless node. For example, a method uses a Hello message to find the channels of the fixed interfaces of a neighbor node and a wireless node two hops away. According to the method, each wireless node periodically broadcasts a Hello message including channel information through all channels. The channel information includes information on the reception interface channel of a wireless node itself and information on the reception interface channel of a neighbor node obtained from the Hello message.

FIG. 6 illustrates a problem of the conventional channel selection method. In FIG. 6, small circles and large circles denote transmission ranges and interference ranges of wireless nodes 601, 602 and 603, respectively.

The wireless node 601, which uses channel 1 as the channel of its fixed interface in a state illustrated in the upper left part of FIG. 6, changes the channel of the fixed interface to channel 2 because the number of channel 2 is the least within its interference range. Through this channel changing process 604, respective channels are distributed as illustrated in the upper right part of FIG. 6.

The wireless node 602, which uses channel 2 as the channel of its fixed interface in a state illustrated in the upper right part of FIG. 6, changes the channel of the fixed interface to channel 3 because the number of channel 3 becomes the least within its interference range due to the channel changing process 604. Through this channel changing process 605, the respective channels are distributed as illustrated in the lower right part of FIG. 6.

The wireless node 603, which uses channel 3 as the channel of its fixed interface in a state illustrated in the lower right part of FIG. 6, changes the channel of the fixed interface to channel 2 because the number of channel 2 becomes the least within its interference range due to the channel changing process 605. Through this channel changing process 606, the respective channels are distributed as illustrated in the lower left part of FIG. 6.

The wireless node 601, which uses channel 2 as the channel of its fixed interface in a state illustrated in the lower left part of FIG. 6, changes the channel of the fixed interface to channel 1 because the number of channel 1 becomes the least within its interference range due to the channel changing process 606. Through this channel changing process 607, the respective channels are finally distributed in the original state illustrated in the upper left part of FIG. 6.

In other words, according to the conventional channel selection method, an infinite loop may be generated in order of the upper left state, the upper right state, the lower right state, the lower left state and the upper left state again, as illustrated in FIG. 6, and thus respective wireless nodes frequently change their channel. The frequent channel change of a neighbor node causes a wireless node transmitting data to frequently change the transmission interface channel of the wireless node, which results in data transmission delay and network performance deterioration.

SUMMARY OF THE INVENTION

The present invention is directed to an excellent channel selection method in the aspects of data transmission delay and network performance.

One aspect of the present invention provides a channel management method for a wireless node in a wireless ad-hoc network, the method comprising the steps of: (a) when a current mode is a first mode, performing channel selection using a method for evenly distributing a channel within an interference range; and (b) when the current mode is a second mode, performing channel selection based on a channel switching probability.

Another aspect of the present invention provides a channel selection method for a wireless node in a wireless ad-hoc network, the method comprising the steps of: (a) calculating channel switching probabilities of respective channels on the basis of channel distribution within an interference range; and (b) determining a channel of a reception interface according to the channel switching probabilities of the respective channels.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which:

FIG. 8 shows a table for describing a second channel scheme of FIG. 7.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

A wireless node obtains channel information by exchanging channel information with a neighbor node. Such exchange of channel information may be periodically performed using, for example, a Hello message, and the period may be, for example, one second. Here, the term "channel information" denotes channel distribution within an interference range, and the phrase "channel distribution within an interference range" denotes distribution of reception interface channels of wireless nodes located within an interference range.

When a wireless node is booted, first, a reception interface channel is randomly selected and set up. After this, as illustrated in FIG. 7, a channel is set by a first channel selection scheme (step 730) or a second channel selection scheme (step 740) selected according to whether or not channel information exists.

Figure 1:
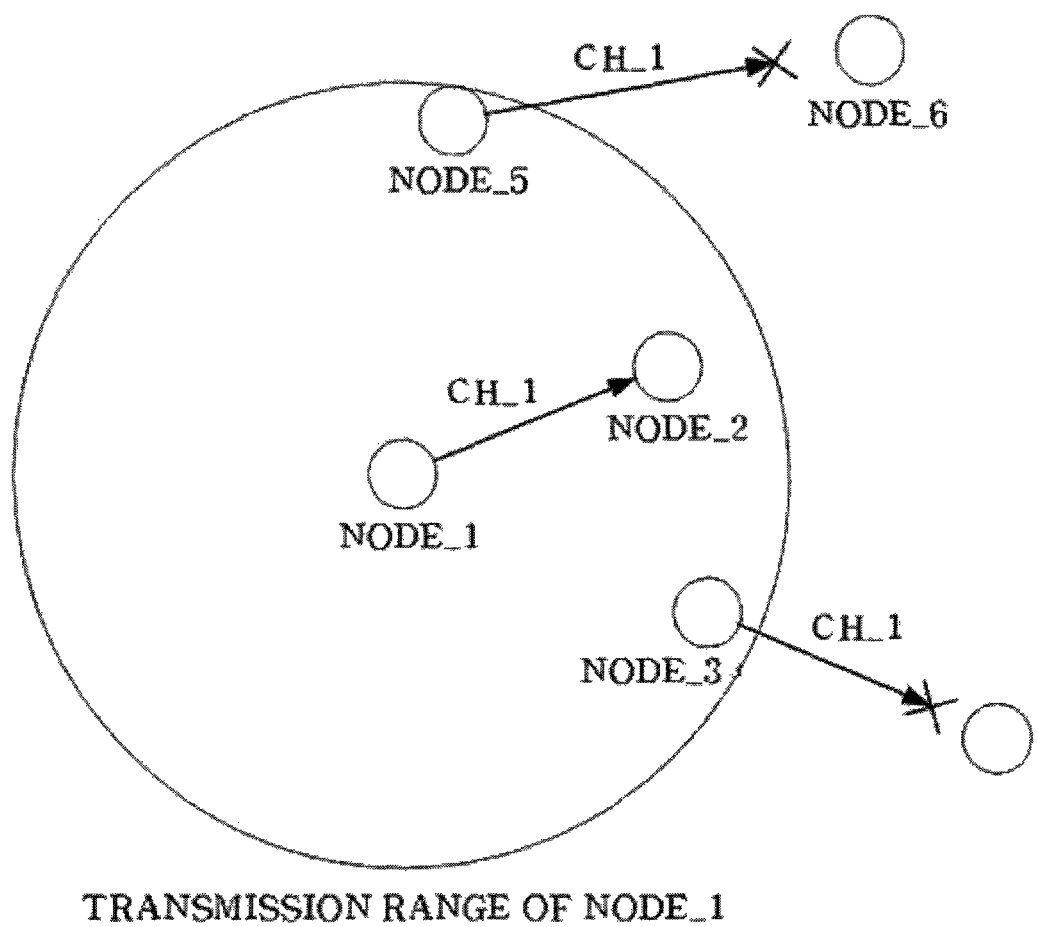
FIGS. 1, 2 and 3 illustrate wireless ad-hoc networks based on single-channel single-interface, multi-channel single-interface, and multi-channel multi-interface, respectively.
Figure 2:
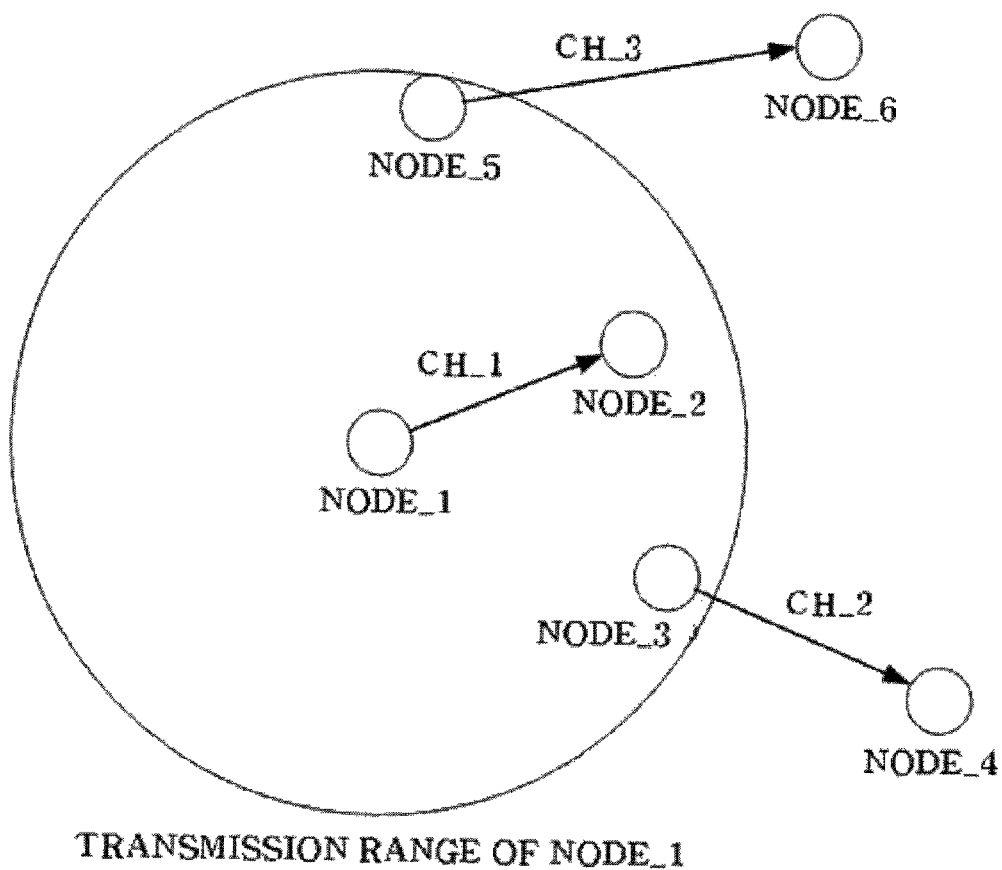
Figure 3:
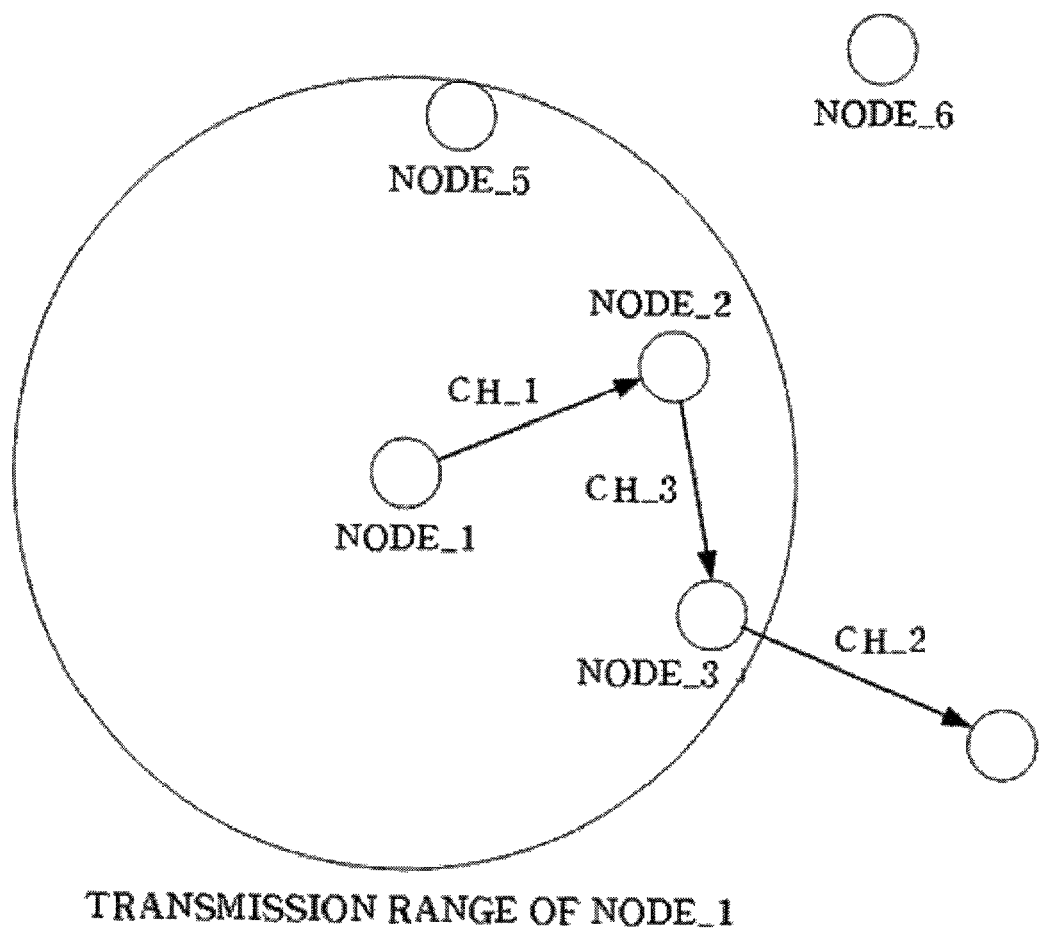
Figure 4:
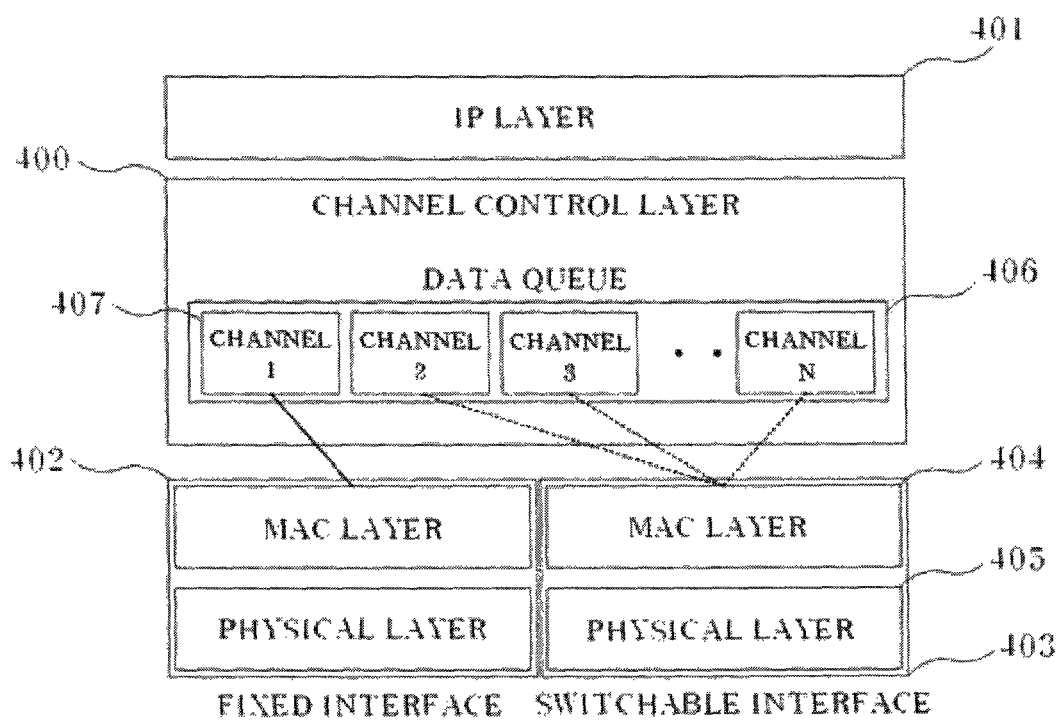
FIG. 4 illustrates the structure of a wireless node using multi-channel multi-interface.
Figure 5:
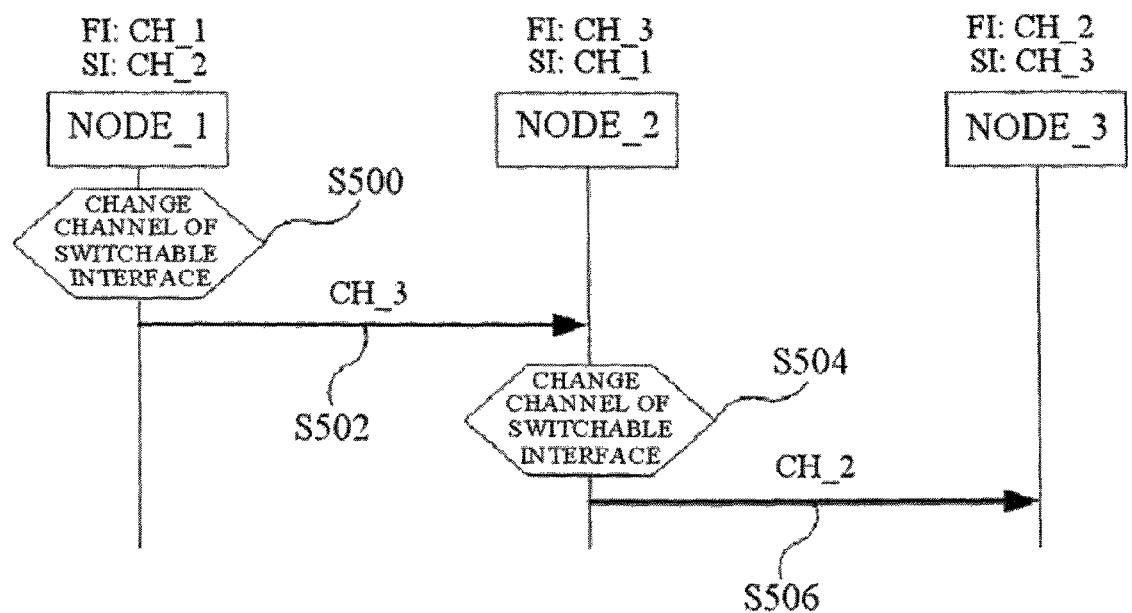
FIG. 5 illustrates a data transmission process in a wireless ad-hoc network based on multi-channel multi-interface.
Figure 6:
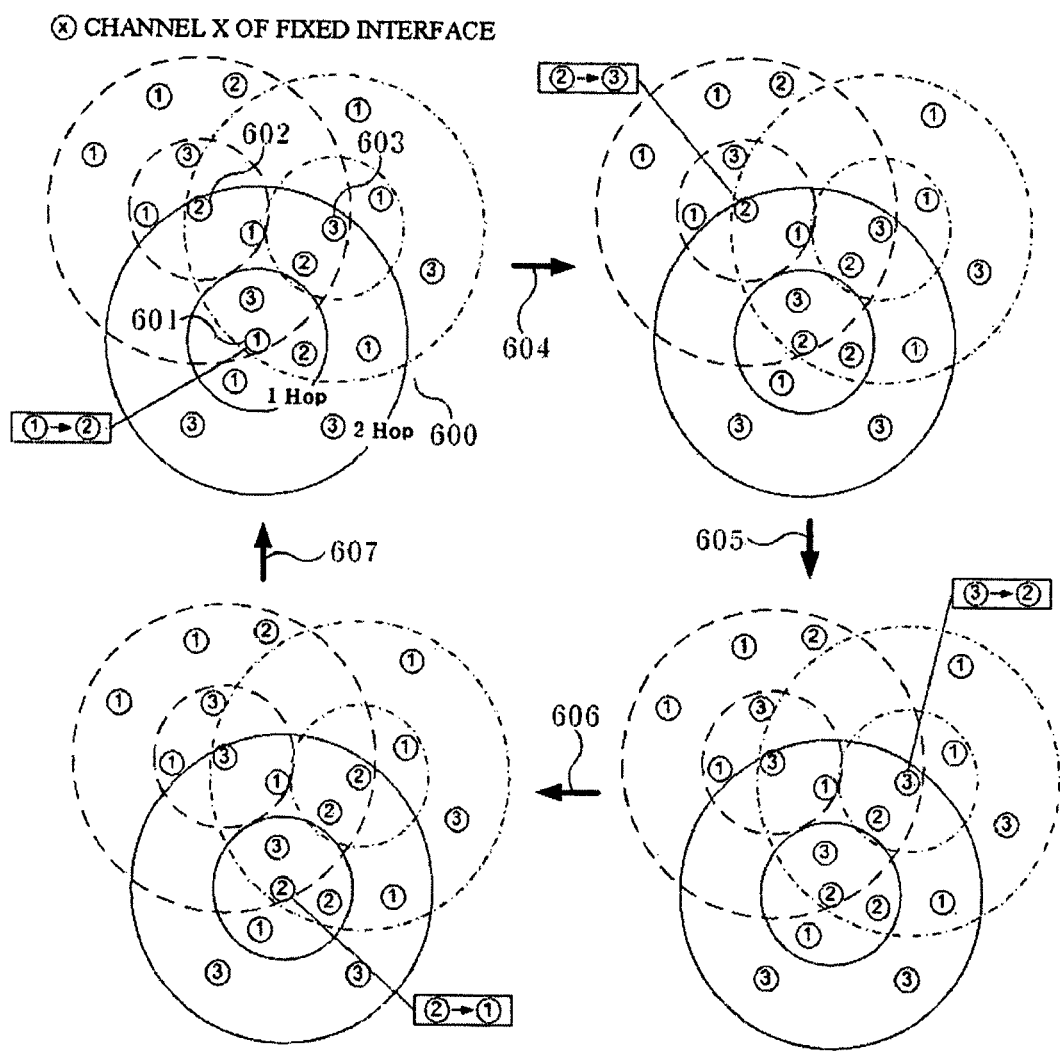
FIG. 6 illustrates a problem of a conventional method of selecting a channel.
Figure 7:
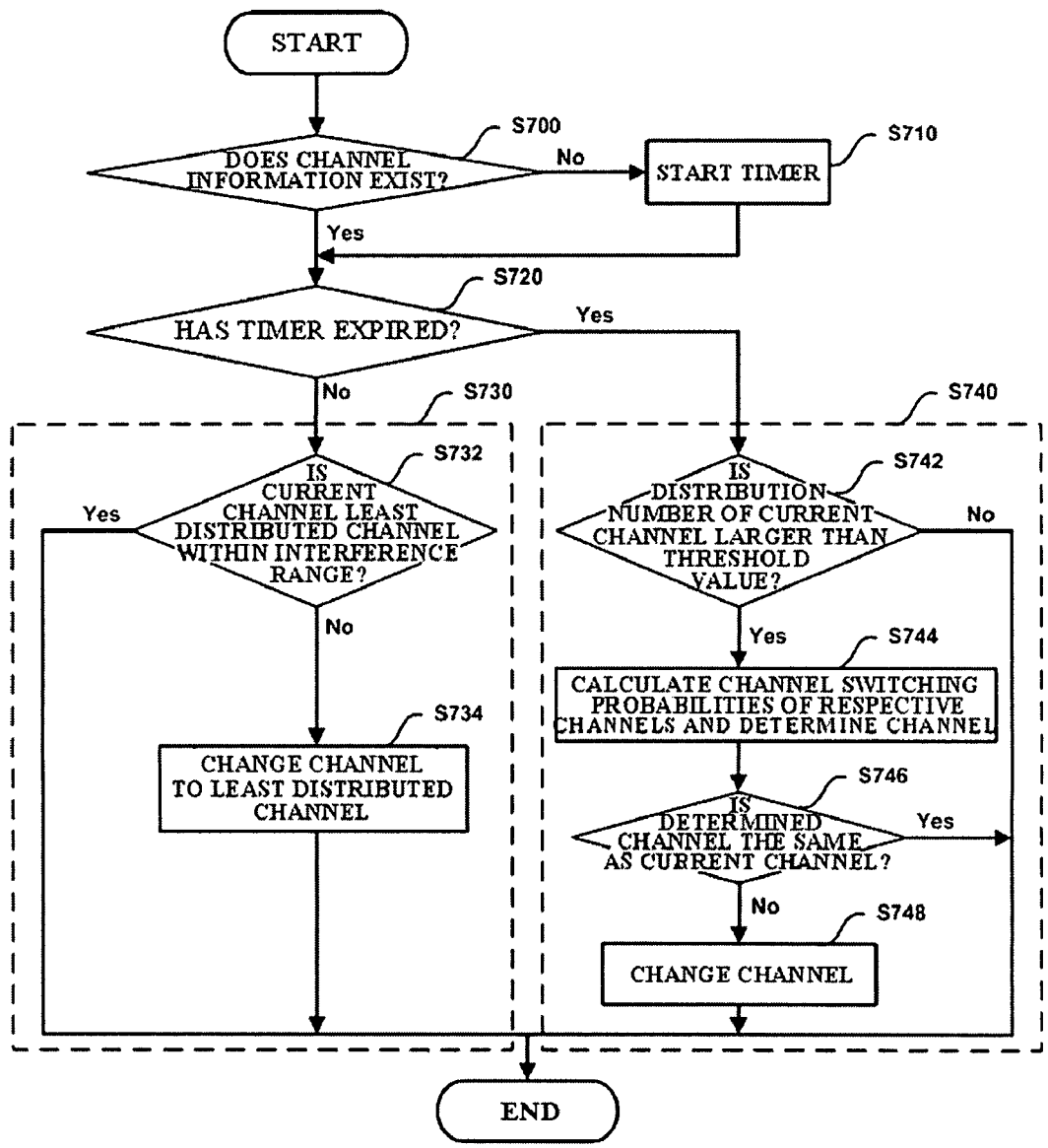
FIG. 7 is a flowchart showing a channel management method according to an exemplary embodiment of the present invention.

FIG. 7 is a flowchart showing a channel management method according to an exemplary embodiment of the present invention.

Referring to FIG. 7, first, a wireless node determines whether there is collected channel information (step 700). When there is no channel information, a timer is started, and then it is determined whether the timer has expired (step 720).

Here, the timer's expiration time is longer than a channel information exchange period and may be, for example, the fifth multiple of the channel information exchange period.

When the timer has not expired, a reception interface channel is set according to the first channel selection scheme (step 730). On the contrary, when the timer has expired, the reception interface channel is set according to the second channel selection scheme (step 740). Here, the first channel selection scheme evenly distributes a reception interface channel within an interference range, and the second channel selection scheme is based on a channel switching probability. The two channel selection schemes are described below.

First, the first channel selection scheme is as follows. The wireless node determines whether its current reception interface channel is the least distributed channel within its interference range (step 732). When the reception interface channel is determined as the least distributed channel in step 732, channel change is not performed, but the current reception interface channel is maintained. On the other hand, when the reception interface channel is not determined as the least distributed channel in step 732, the wireless node changes the reception interface channel to the least distributed channel within the interference range (step 734).

Next, the second channel change method is as follows. The wireless node determines whether the distribution number of the current channel is larger than a threshold value (step 742). Here, the phrase "the distribution number of the current channel" denotes the number of the same channels as the reception interface channel of the wireless node distributed within the interference range. In addition, the threshold value is set to be larger than an average distribution number per channel and may be, for example, the 1.5th multiple of the average distribution number per channel. The larger the threshold value, the more conservatively channel change is performed. In other words, using the threshold value having such a value, it is possible to prevent the above-described frequent channel change.

Here, the average distribution number per channel is calculated by dividing a number M of other wireless nodes in a wireless node's interference range by a number N of channels in the interference range. The phrase "other wireless nodes" denotes wireless nodes except a wireless node within the wireless node's interference range.

When the distribution number of the current channel is determined to be equal to or smaller than the threshold value in step 742, the current channel is maintained. On the other hand, when the distribution number of the current channel is determined to be larger than the threshold value in step 742, the wireless node calculates the channel change possibilities of respective channels and determines a reception interface channel (step 744). A channel switching probability $P_i$ of channel i (i=1, 2, ..., N) is calculated by $$R_i \Big/ \sum_{n=1}^{N} R_n.$$

Here, N denotes the number of channels, and $R_n$ denotes a value in inverse proportion to a distribution number $\alpha_n$ of channel n within an interference range.

In other words, a channel switching probability denotes a possibility that the reception interface channel of a wireless node will be changed to the corresponding channel. In general, the channel switching probability $P_i$ is in inverse proportion to a distribution number $\alpha_i$ of channel i within the interference range. This is because with increase in the distribution number $\alpha_i$, it is more preferable for the wireless node to change channel i, i.e., the current channel, to another channel.

Subsequently, when the channel determined in step 744 is determined to be the same as the current channel (step 746), the wireless node does not perform channel change and maintains the current channel. On the other hand, when the channel determined in step 744 is determined to be different from the current channel (step 746), the wireless node changes the reception interface channel to the determined channel (step 748).

FIG. 8 shows a table for describing the second channel selection scheme of FIG. 7.

The table of FIG. 8 shows a case in which a wireless node uses channel i, and 13 other wireless nodes exist in the interference range of the wireless node. Referring to the table of FIG. 8, a number N of channels is 3, and numbers $\alpha_1$ $\alpha_2$ and $\alpha_3$ of other wireless nodes using channels 1, 2 and 3 are 4, 2 and 7, respectively.

The second channel selection scheme will now be described with reference to the table of FIG. 8. The wireless node performs step 742 of FIG. 7 on the basis of information, which includes $\alpha_1=4$, $\alpha_2=2$ and $\alpha_3=7$, collected by exchanging channel information. Here, the number M of other wireless nodes within the wireless node's interference range is 13, and the number N of channels is 3. Thus, an average distribution number per channel is 13/3. And, when a threshold value is the 1.5th multiple of the average distribution number per channel, it is calculated to be 6.5.

When the current reception interface channel set in the wireless node is channel 2, $\alpha_2$ (=2) is smaller than the threshold value (=6.5), and thus the current channel is maintained. On the other hand, when the current reception interface channel is channel 3, $\alpha_3$ (=7) is larger than the threshold value (=6.5), and thus step 744 of FIG. 7 is performed. In step 744 of FIG. 7, the wireless node calculates channel switching probabilities of the respective channels, and then determines a channel to be set on the basis of the calculated channel switching probabilities, i.e., $P_1=0.34$, $P_2=0.51$ and $P_3=0.15$.

There may be two channel determination methods based on a channel switching probability. According to a first method, the wireless node changes the current reception interface channel to a channel having the highest channel switching probability. According to a second method, the wireless node generates a random variable distributed according to respective channel switching probabilities and then changes the current reception interface channel to a channel corresponding to the generated random variable. In other words, according to the second method, the wireless node generates a random variable under the influence of the channel switching probabilities of respective channels, thereby determining a channel corresponding to the generated random variable and changing the current channel to the corresponding channel.

The present invention can be embodied in a recording medium that can be read by a machine, such as a computer, using a machine-readable code. The machine-readable recording medium includes every recording device that stores machine-readable data. The machine-readable recording medium may be a read-only memory (ROM), a random access memory (RAM), a compact disk read-only memory (CD-ROM), a magnetic tape, a floppy disk, an optical data storage device, and so on. Also, the machine-readable recording medium may be carrier waves, e.g., transmission over the Internet. In addition, the machine-readable recording medium may be distributed to machine systems connected via a network, and the machine-readable code may be stored and executed by a de-centralized method. A functional program, a code, and code segments for embodying the present invention can be easily deduced by programmers in the technical field of the present invention.

According to the present invention, a problem that channel change is continuously repeated in a wireless ad-hoc network using multi-channel multi-interface is solved, and thus it is possible to prevent data transmission delay and network performance deterioration.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A channel management method for a wireless node in a wireless ad-hoc network, the method comprising the steps of:
   (a) when a current mode is a first mode, performing channel selection using a method for evenly distributing a channel within an interference range; and (b) when the current mode is a second mode, performing channel selection based on a channel switching probability, and wherein the channel switching probability denotes a possibility that a reception interface channel of the wireless node will be changed to a corresponding channel, wherein the performing channel selection in the second mode includes:

determining whether a distribution number of a current channel is larger than a predetermined threshold value; and performing the channel selection based on the channel switching probability only when the distribution number of the current channel is larger than the predetermined threshold value, and wherein the distribution number of the current channel denotes a number of same channels as a reception interface channel distributed within the interference range.

2. The method of claim 1, wherein the current mode is determined as the first mode or the second mode according to whether or not there is information on channel distribution within the interference range.

3. The method of claim 1, further comprising the steps of:
determining whether there is information on channel distribution within the interference range;
when there is not the information, starting a timer having a predetermined expiration time; and
determining the current mode as the first mode when the timer expires, and determining the current mode as the second mode when the timer does not expire.

4. The channel management method of claim 1, wherein the performing channel selection in the second mode includes:
maintaining the current reception interface channel when the distribution number is equal to or smaller than the predetermined threshold value.

5. The channel management method of claim 1, wherein the predetermined threshold value is set to be larger than an average distribution number per channel.

6. A channel selection method for a wireless node in a wireless ad-hoc network, the method comprising the steps:
determining whether a distribution number of a current reception interface channel is larger than a predetermined threshold value or not;
maintaining the current reception interface channel when the distribution number is equal to or smaller than the predetermined threshold value; and
calculating channel switching probabilities of respective channels on the basis of channel distribution within an interference range and determining a reception interface channel on the basis of the channel switching probabilities of the respective channels only when the distribution number is larger than the predetermined threshold value, wherein the channel switching probability denotes a possibility that a reception interface channel of the wireless node will be changed to a corresponding channel, and wherein the distribution number of the current channel denotes a number of same channels as a reception interface channel distributed within the interference range.

7. The method of claim 6, wherein the channel switching probabilities of the respective channels are calculated by the following equation:

$$R_i \bigg/ \sum_{n=1}^{N} R_n$$

wherein N denotes the number of channels in the interference range, i denotes a channel index having a value of 1 to N, and $R_i$ is a predetermined parameter calculated by dividing a predetermined constant by a distribution number of corresponding channel i within the interference range, and the distribution number denotes a number of same channels as a reception interface channel of the wireless node distributed within the interference range.

8. The channel selection method of claim 7, wherein the predetermined constant is 1.

9. The channel selection method of claim 6, wherein in the determining a reception interface channel on the basis of the channel switching probabilities of the respective channels, a channel having a highest channel switching probability is selected from the respective channels and determined as the reception interface channel.

10. The channel selection method of claim 6, wherein the predetermined threshold value is set to be larger than an average distribution number per channel.

11. The channel selection method of claim 10, wherein the average distribution number per channel is calculated by dividing a number of other wireless nodes in the interference range of the wireless node by a number of channels in the interference range.

* * * * *